United States Patent
Rhoney et al.

(10) Patent No.: US 7,231,119 B2
(45) Date of Patent: Jun. 12, 2007

(54) DRY FIBER OPTIC ASSEMBLIES AND CABLES

(75) Inventors: Brian K. Rhoney, Hickory, NC (US); Samuel D. Nave, Conover, NC (US); Todd R. Rhyne, Hickory, NC (US); Scott M. Torrey, Hickory, NC (US); Martyn N. Easton, Lenoir, NC (US); David C. Hall, Hickory, NC (US); Alan T. Parsons, Newton, NC (US); Jody L. Greenwood, Hickory, NC (US); Kenneth D. Temple, Jr., Newton, NC (US); Jason C. Lail, Kakegawa (JP)

(73) Assignee: Corning Cable Systems, LLC., Hickory, NC (US)

( * ) Notice: Subject to any disclaimer, the term of this patent is extended or adjusted under 35 U.S.C. 154(b) by 0 days.

(21) Appl. No.: 10/885,546

(22) Filed: Jul. 6, 2004

(65) Prior Publication Data

US 2004/0240808 A1    Dec. 2, 2004

Related U.S. Application Data

(63) Continuation-in-part of application No. 10/862,541, filed on Jun. 7, 2004, now Pat. No. 7,177,507, and a continuation-in-part of application No. 10/847,807, filed on May 18, 2004, now abandoned, which is a continuation-in-part of application No. 10/661,204, filed on Sep. 12, 2003, which is a continuation-in-part of application No. 10/326,022, filed on Dec. 19, 2002, now Pat. No. 6,970,629.

(51) Int. Cl.
*G02B 6/44* (2006.01)

(52) U.S. Cl. ........................................ 385/100; 385/108

(58) Field of Classification Search ................ 385/100, 385/108, 109, 113
See application file for complete search history.

(56) References Cited

U.S. PATENT DOCUMENTS 4,707,569 A    11/1987  Yoshimura et al. .......... 174/116

(Continued)

FOREIGN PATENT DOCUMENTS

DE    10129772 A1    1/2003

(Continued)

OTHER PUBLICATIONS

Norris, R. H.; Weimann, P.A., "Dry Central Tube Ribbon Cables for the Outside Plant Environment", Proc. Of the 51st Intern. Wire & Cable Symposium, p. 202-210 (2002).

(Continued)

*Primary Examiner*—Hae Moon Hyeon (57) ABSTRACT

A tube assembly of the present invention has at least one subunit with at least one dry insert generally surrounding the subunit which may be disposed within a tube, thereby forming a tube assembly. The subunit includes a fiber optic ribbon and a sheath, wherein the sheath is tight-buffered about the fiber optic ribbon, thereby inhibiting buckling of the ribbon during temperature variations. Additionally, the tube assembly can be a portion of a fiber optic cable having a sheath that may include a plurality of strength members and a cable jacket. In other embodiments, the subunits and dry insert are disposed within a cavity, thereby forming a tubeless cable. Additionally, subunits may include a marking indicia for denoting the security level.

12 Claims, 10 Drawing Sheets

U.S. PATENT DOCUMENTS

| | | | |
|---|---|---|---|
| 4,725,628 A | 2/1988 | Garvey et al. | 521/137 |
| 4,725,629 A | 2/1988 | Garvey et al. | 521/137 |
| 4,818,060 A | 4/1989 | Arroyo | 350/96.23 |
| 4,900,126 A * | 2/1990 | Jackson et al. | 385/114 |
| 4,906,067 A | 3/1990 | Mayr et al. | 350/96.23 |
| 4,909,592 A | 3/1990 | Arroyo et al. | 350/96.23 |
| 4,913,517 A | 4/1990 | Arroyo et al. | 350/96.23 |
| 5,016,952 A | 5/1991 | Arroyo et al. | 350/96.2 |
| 5,062,685 A | 11/1991 | Cain et al. | 350/96.23 |
| 5,133,034 A | 7/1992 | Arroyo et al. | 385/107 |
| 5,224,190 A | 6/1993 | Chu et al. | 385/107 |
| 5,224,191 A | 6/1993 | Zeidler | 385/111 |
| 5,243,675 A | 9/1993 | Kathiresan et al. | 385/109 |
| 5,343,549 A | 8/1994 | Nave et al. | 385/103 |
| 5,422,973 A | 6/1995 | Ferguson et al. | 385/112 |
| 5,509,097 A | 4/1996 | Tondi-Resta et al. | 385/113 |
| 5,566,266 A | 10/1996 | Nave et al. | 285/113 |
| 5,621,841 A | 4/1997 | Field | 385/113 |
| 5,621,842 A | 4/1997 | Keller | 385/114 |
| 5,689,601 A | 11/1997 | Hager et al. | 385/100 |
| 5,698,615 A | 12/1997 | Polle | 523/173 |
| 5,748,823 A | 5/1998 | Nave | 385/113 |
| 5,763,067 A | 6/1998 | Bruggemann et al. | 428/317.9 |
| 5,838,863 A * | 11/1998 | Fujiura et al. | 385/103 |
| 5,857,051 A | 1/1999 | Travieso et al. | 385/114 |
| 6,091,871 A | 7/2000 | Elisson et al. | 385/113 |
| 6,122,424 A * | 9/2000 | Bringuier | 385/100 |
| 6,167,178 A | 12/2000 | Nave | 385/103 |
| 6,215,932 B1 | 4/2001 | Hardwick, III et al. | 385/114 |
| 6,226,431 B1 | 5/2001 | Brown et al. | 385/114 |
| 6,229,944 B1 | 5/2001 | Yokokawa et al. | 385/114 |
| 6,278,826 B1 | 8/2001 | Sheu | 385/109 |
| 6,301,413 B1 | 10/2001 | Bringuier | 385/100 |
| 6,317,542 B1 | 11/2001 | Hardwick, III et al. | 385/114 |
| 6,321,013 B1 | 11/2001 | Hardwick, III et al. | 385/114 |
| 6,377,738 B1 * | 4/2002 | Anderson et al. | 385/113 |
| 6,389,204 B1 * | 5/2002 | Hurley | 385/102 |
| 6,404,962 B1 | 6/2002 | Hardwick, III et al. | 385/114 |
| 6,487,348 B1 | 11/2002 | Jackson | 385/114 |
| 6,504,979 B1 | 1/2003 | Norris et al. | 385/109 |
| 6,529,663 B1 * | 3/2003 | Parris et al. | 385/113 |
| 6,658,185 B2 * | 12/2003 | Bosisio et al. | 385/109 |
| 2003/0044137 A1 | 3/2003 | Lopez | |
| 2004/0120662 A1 | 6/2004 | Lail et al. | |
| 2004/0120663 A1 | 6/2004 | Lail et al. | |

FOREIGN PATENT DOCUMENTS

| | | |
|---|---|---|
| EP | 0577233 A1 | 5/1993 |
| JP | 61023104 A | 1/1986 |
| JP | 09-152535 | 6/1997 |
| JP | 11271581 A | 10/1999 |
| JP | 11337783 A | 12/1999 |
| JP | 2001343565 A | 12/2001 |
| JP | 2001343566 A | 12/2001 |
| JP | 2002236241 A | 8/2004 |

OTHER PUBLICATIONS

Van Vickle, P., et al., "Innovative Dry Buffer Tube Design for Central Tube Ribbon Cable", Proc. Of the 2001 National Fiber Optics Engineers Conference, p. 154-161 (2001).

Taylor, C., et al., "Effect of Water Blocking Materials On Moisture Diffusion in Prototype Cable Structures", Proc. Of the 50th Intern. Wire & Cable Symposium, p. 518-525 (2001).

Dixon, L., et al., "Crush and Bending Resistance in Next Generation Cable Designs", Proc. Of the 50th Intern. Wire & Cable Symposium, p. 422-431 (2001).

Wagman, R., et al., "BOTDR Analysis of Cable Tensile Testing", Proc. Of the 48th Intern. Wire & Cable Symposium p. 658-664 (1999).

Beasley, B., "Look Mom! No Gel!" Outside Plant Magazine. Dec. 2002 p. 16-18.

Geca-Tapes, Non-Woven Wrapping-Tapes Catalog "Foam Tapes", Apr. 1996.

Geca-Tapes, Waterblocking Tapes Catalog "Waterblocking Foam Tapes", Apr. 1996.

Dow Plastics, "Resin For Pipe Extrusion and Pipe Fittings", Apr. 7, 2003.

FITEL "MPO Connector", 2001.

* cited by examiner

DRY FIBER OPTIC ASSEMBLIES AND CABLES

RELATED APPLICATIONS

The present application is a Continuation-In-Part (CIP) of U.S. Ser. No. 10/862,541 filed on Jun. 7, 2004 now U.S. Pat. No. 7,177,507. The present application is also a Continuation-In-Part (CIP) of U.S. Ser. No. 10/847,807 filed on May 18, 2004 now abandoned, which is a Continuation-In-Part of U.S. Ser. No. 10/661,204 filed on Sep. 12, 2003, which is a Continuation-In-Part of U.S. Ser. No. 10/326,022 filed on Dec. 19, 2002 now U.S. Pat. No. 6,970,629, the disclosures of which are incorporated herein in their entirety by reference.

FIELD OF THE INVENTION

The present invention relates generally to fiber optic assemblies and cables. More specifically, the invention relates to breakout fiber optic assemblies and cables having a security feature.

BACKGROUND OF THE INVENTION

Optical cables include optical waveguides such as optical fibers that transmit optical signals such as voice, video, and/or data information. One type of fiber optic cable is a breakout fiber optical cable. A breakout fiber optic cable generally includes several protected structures that are capable of being broken-out from an assembly or cable and run to desired locations for optical connection.

Figure 11:
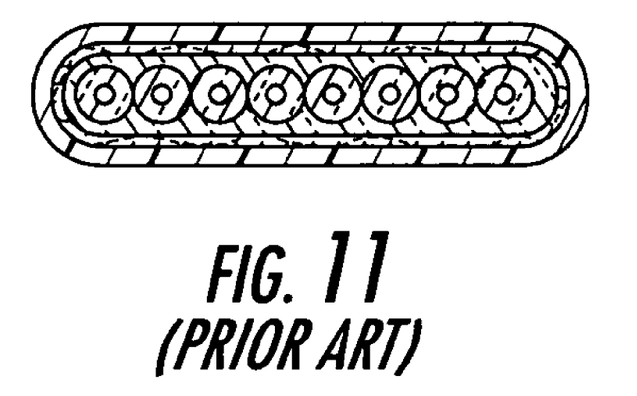
FIG. 11 is a cross-sectional view of a conventional optical fiber ribbon structure.

U.S. Pat. No. 5,857,051 is an example of a breakout fiber optic cable that discloses a plurality of optical fiber ribbon structures in a tube. As depicted in FIG. 11, an optical fiber ribbon structure 110 requires a fiber optic ribbon 112 and a plurality of strength members 116 surrounded by a relatively loose sheath 118. Strength members 116 are aramid fibers that are used to protect a plurality of optical fibers 112a of fiber optic ribbon 112 from breakage due to tensile forces applied to the optical fiber ribbon structure 110. The fiber optic cable can include flame-retardant materials for riser or plenum applications; however, this cable has disadvantages.

Figure 12:
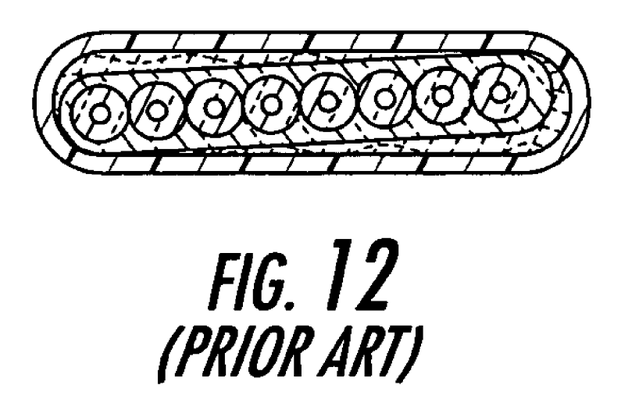
FIG. 12 is a cross-sectional view of the optical fiber ribbon structure of FIG. 11 depicting the optical fiber ribbon rotating relative to the sheath.

For example, since sheath 118 is relatively loosely disposed around the optical fiber ribbon 112, ribbon 112 can rotate relative to sheath 118 as depicted in FIG. 12. Stated another way, when the ribbon structures are stranded within the tube, portions of optical fiber ribbon 112 can twist and contact the inner wall of sheath 118 causing local stress points. These local stress points can cause undesired optical attenuation in the optical fibers adjacent to the local stress point and may even render the optical fibers inoperable. Additionally, when subject to temperature variations, sheath 118 can shrink which can cause stresses and/or strains on optical fiber ribbon 112. For instance, the shrinking sheath 118 can cause a compressive force that undulates or buckles optical fiber ribbon 112 along its length, thereby causing undesired optical attenuation. Additionally, the breakout fiber optic cable of the '051 patent is not suited for outdoor applications since it does not block the migration of water. Moreover, the flame-retardant materials of sheath 118 are, generally speaking, not compatible for contact with traditional cable filling materials.

BRIEF DESCRIPTION OF THE FIGURES

FIG. 3 is a cross-sectional view of a tube assembly according to the present invention having the dry insert of FIG. 2a.

DETAILED DESCRIPTION OF THE INVENTION

The present invention will now be described more fully hereinafter with reference to the accompanying drawings showing preferred embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

Figure 1:
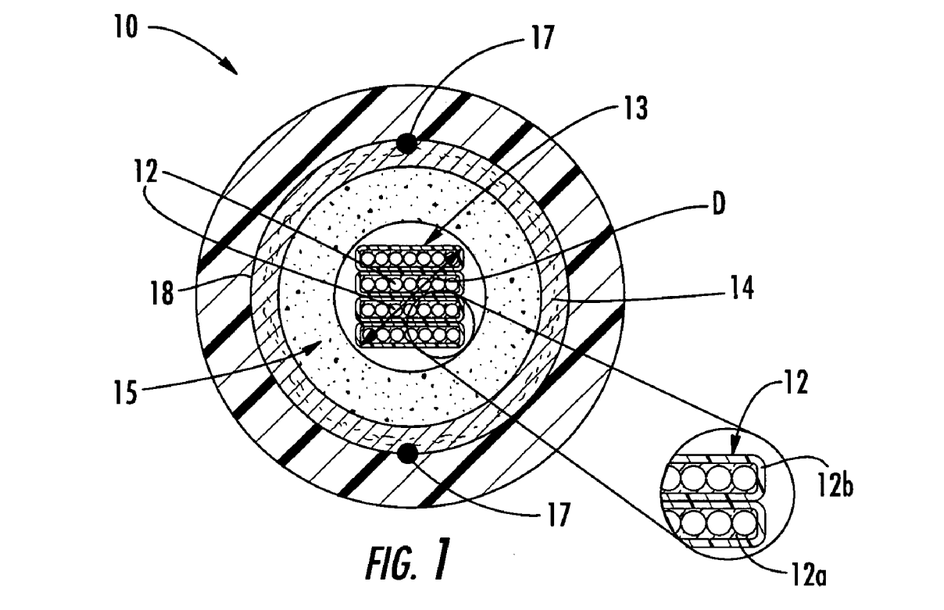
FIG. 1 is a cross-sectional view of a tube assembly according to the present invention.
Figure 5:
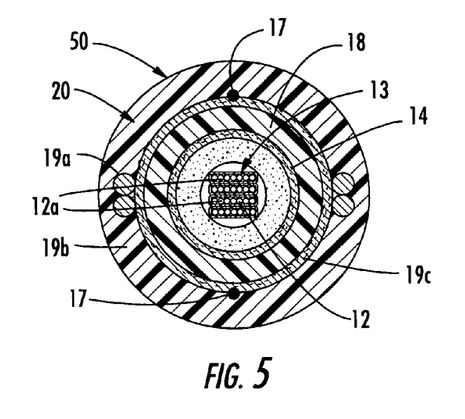
FIGS. 5 and 5a are a cross-sectional views of different fiber optic cables according to the present invention using the tube assembly of FIG. 1.
Figure 5A:
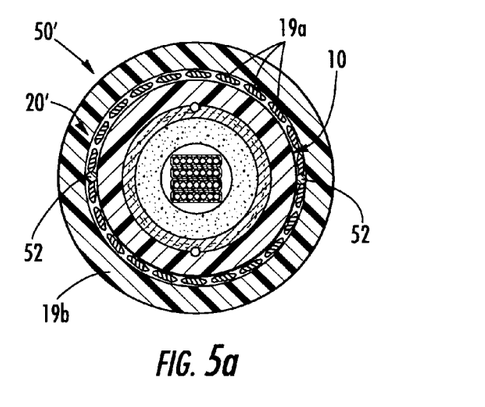
Figure 6:
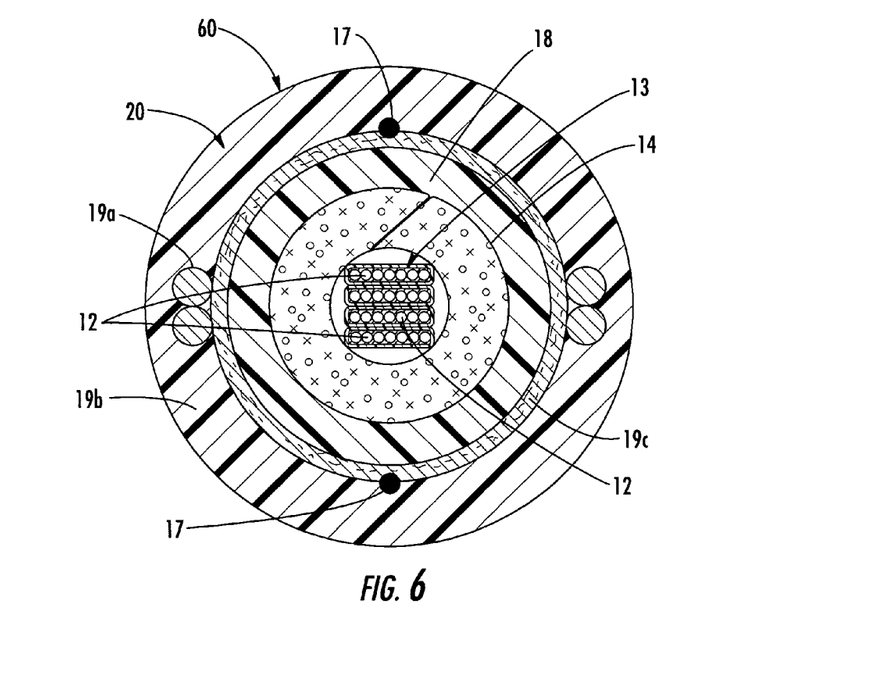
FIG. 6 is a cross-sectional view of a fiber optic cable according to the present invention using the tube assembly of FIG. 3.

Illustrated in FIG. 1 is an exemplary tube assembly 10 according to one aspect of the present invention. Tube assembly 10 includes at least one subunit 12, at least one dry insert 14, and a tube 18. In this case, the at least one subunit 12 is a portion of a stack of subunits 13 having a diagonal D dimension across the corners of the stack. Preferably, subunit stack 13 is stranded within tube 18. Stranding can be helical, S-Z, or other suitable stranding configurations. Dry insert 14 generally surrounds the at least one subunit 12 and forms core 15, which is disposed within tube 18. Dry insert 14 performs functions such as cushioning, coupling, inhibiting the migration of water, and accommodates bending. Dry insert 14 is advantageous because the subunits are easily removed therefrom without leaving a residue or film that requires cleaning while still providing a water-blocking function. Moreover, unlike conventional thixotropic materials, dry insert 14 does not change viscosity with temperature variations or have a propensity to drip from an end of the tube at high temperatures. Still further, dry insert 14 is compatible with subunits 12 having flame retardant materials so that tube assembly 10 is suitable for both indoor and outdoor applications. Additionally, tube assembly 10 can include other suitable components such as a binder thread 17 to hold dry insert 14 about subunits 12 or other components such as a ripcord in the tube wall, unsheathed ribbons, and/or an electrical component. For instance, two or more polyester binder threads may be stitched together for holding dry insert 14 together before extruding tube 18 therearound. Additionally, tube assemblies 10 can be a portion of cable as shown in FIGS. 5 and 5a. Furthermore, dry inserts 14 according to the present invention may be used with tubeless cable designs.

Each subunit 12 includes a single fiber optic ribbon 12a (hereinafter ribbon) surrounded by a sheath 12b that is tight-buffered thereon to couple sheath 12b and ribbon 12a, thereby inhibiting ribbon 12a from twisting relative to sheath 12b and generally protecting ribbon 12a. As used herein, tight-buffered means that the sheath may contact at least a portion of the ribbon and excludes strength members inside the sheath; however, tight-buffered configurations can include a thin layer(s) and/or film(s) disposed between the ribbon and the sheath. Thin layers or films can include a talc powder, a water-swellable material, a tape, or other suitable materials; however, any thin layer or film should not inhibit coupling between sheath 12b and ribbon 12a. Tight-buffering each ribbon 12a improves buckling resistance compared with a loose sheath that allows the ribbon to twist within the sheath, thereby causing contact stresses that can result in elevated optical attenuation. Furthermore, tight-buffering of ribbon 12a provides a security feature as will be discussed. Of course, ribbons can have any suitable number of optical waveguides and subunits of the stack can have different numbers of optical waveguides.

In this case, ribbon 12a includes a plurality of optical fibers (not numbered), more specifically, single-mode optical fibers connected by a matrix material as known in the art. However, other suitable types or configurations of optical fibers/ribbons can be used. For example, optical fibers can be multi-mode, pure-mode, erbium doped, polarization-maintaining fiber, other suitable types of light waveguides, and/or combinations thereof. For instance, each optical fiber can include a silica-based core (not numbered) that is operative to transmit light and is surrounded by a silica-based cladding (not numbered) having a lower index of refraction than the core. Additionally, one or more coatings can be applied to optical fiber. For example, a soft primary coating (not numbered) surrounds the cladding, and a relatively rigid secondary coating (not numbered) surrounds the primary coating. The coating can also include an identifying means such as ink or other suitable indicia for identification and/or an anti-adhesion agent that inhibits the removal of the identifying means. Suitable optical fibers are commercially available from Corning Incorporated of Corning, N.Y. Furthermore, the concepts of the present invention are suitable with other types of optical waveguides such as plastic optical fibers.

Sheath 12b is preferably constructed of a suitable polymeric material, but other materials such as UV cured materials may be used. If the cable is intended for indoor applications or both indoor/outdoor applications, sheath 12b is preferably constructed from a flame-retardant material so that tube assembly 10 may be rated for plenum or riser applications. Suitable flame-retardant materials include polyvinyl chloride (PVC), polyvinylidene fluoride (PVDF), flame-retardant polyethylene (FRPE), but other suitable flame-retardant materials can be used. Unlike conventional tube assemblies using traditional cable filling materials, embodiments of the present invention are advantageous because dry insert 14 is compatible with the flame-retardant materials of sheath 12b, thereby making tube assembly 10 suitable for outdoor applications. Likewise, tube 18 is preferably constructed of a polymeric material, more preferably a flame-retardant material if intended for indoor applications.

Sheath 12b is preferably tight-buffered about a respective ribbon 12a so that sheath 12b and the respective ribbon 12a are coupled together. Coupling the two components together creates a relatively robust subunit 12 that can be stranded with a predetermined lay length without causing undue optical attenuation. In other words, stranding subunits does not cause local stress and/or strain on ribbon 12a since it generally speaking is not free to rotate relative to sheath 12b. Moreover, since the sheath and the ribbon are coupled together the sheath is inhibited from shrinking due to temperature variations. In other words, the two components act as a unit to inhibit buckling, rather than the sheath having relatively large shrinkage relative to the ribbon, which causes undulations and/or buckling of the ribbon and create undesirable optical attenuation. Moreover, a wall thickness of sheath 12b is as thin as possible while still providing adequate protection and buckling resistance, rather than being relatively thick or foamed, which increases the thickness and space required. Stated another way, a smaller subunit allows more subunits to fit within a predetermined space. By way of example, sheath 12b has a thickness of about 0.3 mm or less; however, other suitable dimensions are possible.

Additionally, sheath 12b provides a security feature by surrounding ribbon 12a, thereby making tapping an optical signal from an optic fiber more difficult and easier to detect. In other words, a portion of sheath 12b must be removed to midspan access ribbon 12a after subunits 12 are broken out from tube assembly 10. Moreover, detecting tampering with ribbon 12a is easier because a craftsman can inspect sheath 12b along its length for any tampering therewith. Furthermore, each sheath can include a marking indicia (not shown) for identification of a particular subunit for routing/connectorization purposes. For instance, the marking indicia can be characters printed on sheath 12b, different colored sheaths 12b, combinations thereof, or other suitable marking indicia for connectorization purposes or for indicating different security levels. By way of example, four subunits in a tube assembly having two different security levels are denoted by two different colored sheaths such as yellow and orange. In order for the craftsman to further distinguish among a plurality of subunits having the same color sheath each individual subunit has a unique print indicia such as numbers.

Additionally, embodiments of the present invention may have a positive excess subunit length (ESL), although a negative ESL is possible. As used herein, ESL is defined as the length of the particular subunit minus the length of the tube or cable containing the subunit divided by the length of the tube or cable containing the subunit, which can be expressed as a percentage by multiplying by 100. Whether the ESL is calculated using the tube length or the cable length depends on the particular configuration. Moreover, individual subunits of a tube or cable can have different values of ESL. By way of example, subunits of the cable have a positive ESL, preferably a positive ESL in the range of about 0.0% to about 0.2% or greater.

Figure 2:
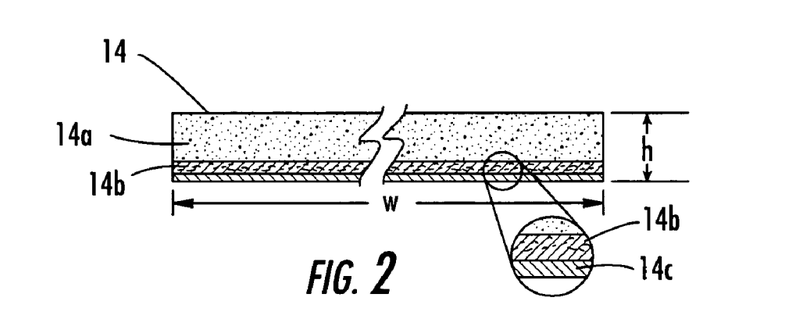
FIG. 2 is a cross-sectional view of the dry insert of the tube assembly of FIG. 1.

FIG. 2 illustrates a cross-sectional view of an explanatory dry insert 14. Dry insert 14 is formed from an elongate material or materials that are capable of being paid off from a reel for a continuous application during manufacture. Dry insert 14 can be formed from a plurality of layers that can perform different functions; however, the dry insert can be a single layer such as a felt material that is compressible. Dry insert 14 can cushion subunit 12 from tube 18 and also provides coupling, thereby maintaining optical attenuation of optical waveguide 12 below about 0.4 dB/km at a reference wavelength of 1310 nm and 0.3 dB/km at reference wavelengths of 1550 nm and 1625 nm, more preferably, the attenuation is 0.35/0.25 dB/km for the respective wavelengths. In one embodiment, dry insert 14 is formed from two distinct layers. For instance, FIG. 2 depicts a first layer 14a of dry insert 14 that is a compressible layer and second layer 14b that is a water-swellable layer. In this case, first layer 14a is formed from a compressible material having a predetermined spring constant for providing adequate coupling characteristics. By way of example, the first layer is a foam tape, preferably, an open cell foam tape; however, any suitable compressible material can be used such as a closed cell foam tape. As shown in FIG. 2, second layer 14b can have any suitable construction and in preferred embodiments is a suitable water-swellable tape having one or more components. For instance, water-swellable tapes can have different constructions as shown by the two different detail bubbles of FIG. 2, but generally include at least one tape such as a non-woven tape 14f having a plurality of water-swellable particles 14e. However, dry insert 14 can include other types of particles formed from one or more materials.

First layer 14a and second layer 14b are preferably attached together with an adhesive 14d so that a force of about 5 Newtons or more is required to separate the layers. Adhesive 14d can be sprayed onto one or both of the layers during manufacture, thereby creating a fine mist that inhibits clusters of adhesive from forming; however, other suitable application methods are also possible. But, the adhesive may have other forms such as a powder that is applied to one or more layers. Whatever the form of adhesive used, it should not cause elevated levels of attenuation when the dry insert is placed about the subunits. However, the present invention is also advantageous because sheath 12b of subunits 12 acts as an additional protective layer for inhibiting microbending compared with unsheathed ribbons.

Likewise, water-swellable particles or conglomerate particles such as adhesive and/or water-swellable particles should not cause microbending. In other words, the average particle size of adhesive 14d, or other conglomerate materials such as adhesive and water-swellable powder, should be relatively small for inhibiting microbending. By way of example, particles should have an average particle size of about 600 microns or less, preferably about 450 microns or less, and most preferably about 300 microns or less so that if the particles press against the subunits through a portion of dry insert 14 they will not cause elevated levels of microbending, but larger average particles sizes may be possible since sheath 12b acts as a buffer. As used herein, average particle size refers to particles of one or more materials used in dry insert 14.

As shown in the right detail bubble of FIG. 2, second layer 14b is a water-swellable tape having water-swellable particles 14e disposed between two non-woven tape-like materials 14f that is attached by adhesive 14d to first layer 14a. This construction inhibits particles from causing microbending since there is a non-woven tape that acts as a buffer between first layer 14a and water-swellable particles 14e. In one embodiment, the average particle size of the water-swellable powder is relatively small such as 600 microns or less, preferably about 450 microns or less, and most preferably about 300 microns or less so that if the water-swellable particles press against the optical waveguide through a portion of dry insert 14 they will not cause elevated levels of microbending. Second layer 14b can have other constructions such as shown in the left detail bubble of FIG. 2. Specifically, this embodiment shows a water-swellable particles 14e attached to one side of a single non-woven tape 14f, which is then attached to compressible first layer 14a so that water-swellable particles 14e are disposed between the first and second layers without a buffer layer. In this construction adhesive 14f functions to attach water-swellable particles 14e and to attach the first and second layers 14a, 14b of dry insert 14 together. However, this construction of dry insert 14 generally leads to a larger average particle size of a conglomerate material formed of adhesive and water-swellable particles. In other words, all things being equal the average particle size in this dry insert construction is generally larger because it creates a conglomerate particle compared with the water-swellable particle alone. Consequently, this may cause elevated microbending if the average particle size becomes too large. So in this construction the average particle size of the conglomerate or composite particle preferably is in the same range as stated above for inhibiting microbending.

Likewise, the inner surface of dry insert 14 should not cause elevated levels of microbending. Thus, in preferred embodiments, a surface of the layer that can contact the optical waveguides should have a relatively smooth surface. For instance, if foam is used as first layer 14a of dry insert 14 an average cell size of the foam can be about 1000 microns or less, and more preferably about 700 microns or less, thereby creating a relatively smooth surface. Additionally, the foam may have layers with different size cells such as larger cells away from the optical waveguides and smaller cells near the surface of the foam that can contact the optical waveguides. Other variations include a surface treatment for smoothing the surface of the foam layer. Surface treatments include heating to smooth out the surface or filling the cells with a suitable material. Additionally, first layer 14a such as foam cushions the water-swellable particles and/or adhesive of dry insert 14 from causing microbending.

In one embodiment, the first layer is an open cell polyurethane (PU) foam tape. The PU foam tape may either be an ether-based PU or an ester-based PU, but other suitable foam tape compressible layers can be used such as a polyethylene foam, a polypropylene foam, or EVA foam. However, preferred embodiments use an ether-based foam tape since it performs better than an ester-based PU foam when subject to moisture. In other words, the ester-based PU foam can break down with moisture, whereas the ether-based PU foam is generally more robust with respect to moisture. Additionally, the foam layer has a predetermined density generally in the range of about 1 lb/ft$^3$ to about 3 lb/ft$^3$, but in preferred embodiments the density is about 2 lb/ft$^3$. Dry insert 14 also has a predetermined ultimate tensile strength to inhibit breakage during manufacture. Generally speaking, with dry inserts having both a compressible layer and a water-swellable layer the majority of the tensile strength is provided by the water-swellable layer(s). The ultimate tensile strength of the dry insert is preferably about 20 Newtons per centimeter width W of dry insert 14 or greater, more preferably about 30 Newtons per centimeter width W of dry insert 14 or greater.

Figure 2A:
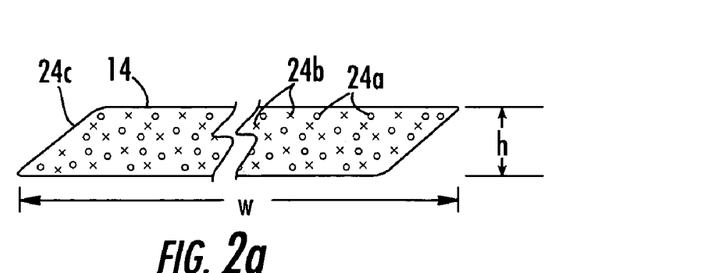
FIG. 2a is a cross-sectional view of another dry insert according to the present invention.

FIG. 2a depicts another dry insert 14 having a single, non-woven layer of felt made of one or more materials. In this case, dry insert 14 comprises a plurality of water-swellable filaments 24a along with other filaments 24b that are non-swellable in water, thereby forming a layer of felt having multiple materials. As used herein, felt means a material comprising one or more types of non-continuous filaments and/or fibers which have been caused to adhere and mat together through the action of heat, moisture, chemicals, pressure, or a combination of the foregoing actions, thereby forming a relatively thick and compressible layer. Water-swellable filaments 24a may comprise any suitable water-swellable material, but preferably include at least one superabsorbant polymer. Preferred superabsorbent polymers are partially cross-linked polymers that absorb many times their own weight in water and swell considerably without dissolving, for example, acrylate, urethane or cellulosic-based materials. By way of example, the single layer dry insert 14 of FIG. 2a may include about 25% or less by weight of water-swellable filaments 24a and about 75% or more by weight of other filaments 24b; however, other suitable ratios are possible. Likewise, in this configuration the density of the dry insert can be influenced to meet the needs of the tube assembly. Generally speaking, the single layer felt dry insert is a compressible layer for cushioning and coupling of the optical fibers and may include water-swellable materials for inhibiting the migration of water. Unlike conventional water-swellable tapes the single layer felt has a relatively large thickness that generally speaking fills spaces within the tube or cavity. Moreover, the felt dry insert may use water-swellable filaments that aid in providing compressibility or fluffiness of the dry insert, rather than water-swellable powders that are used in conventional water-swellable tapes.

Figure 2B:
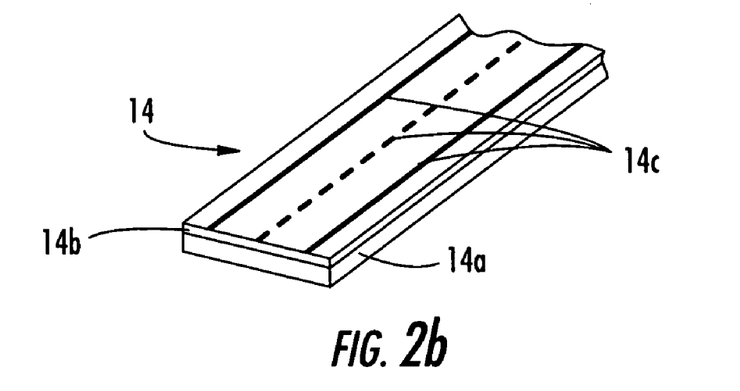
FIGS. 2b–2d depict various configurations of an adhesive/glue applied to the dry insert of FIG. 2.
Figure 2C:
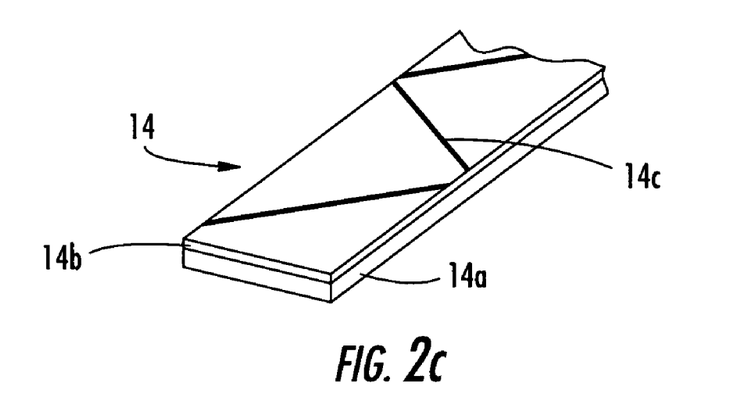
Figure 2D:
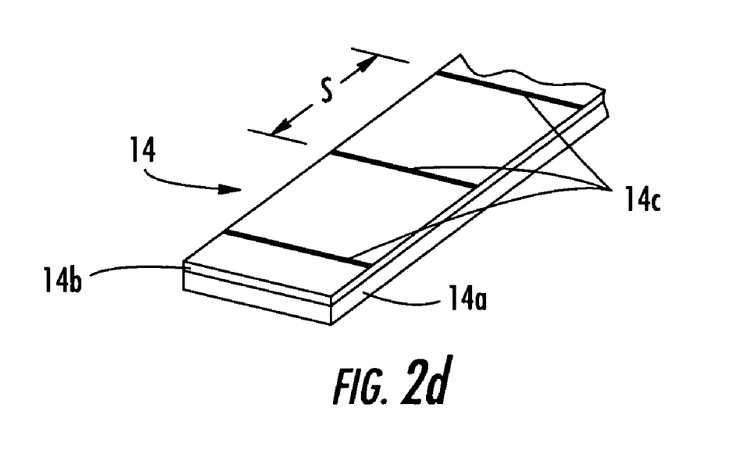
Figure 3:
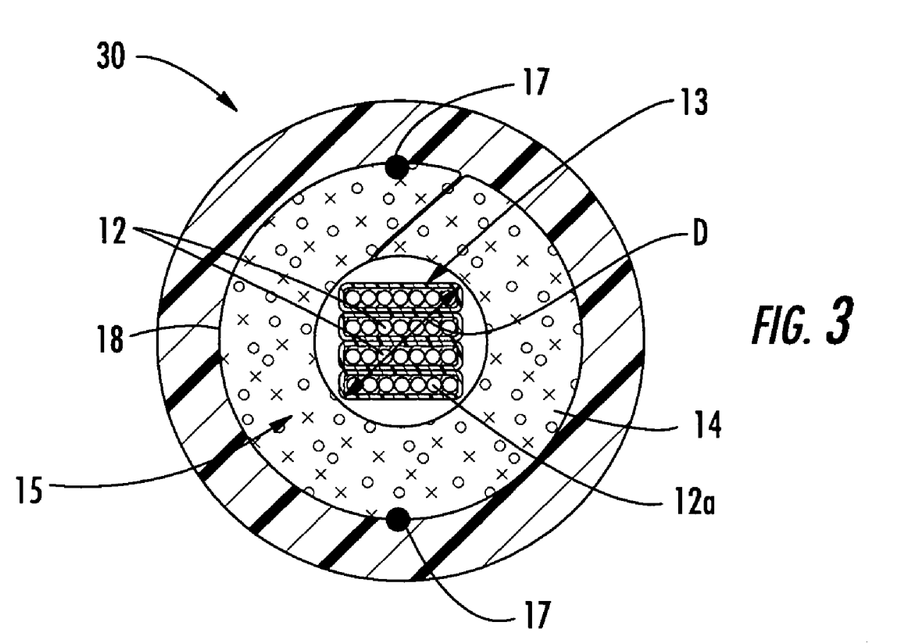

Other filaments 24b may include any suitable filament and/or fiber material such as polymer filaments like polypropylene, polyethylene, and polyesters, likewise, other suitable materials such as cottons, nylon, rayons, elastomers, fiberglass, aramids, polymers, rubber-based urethanes, composite materials and/or blends thereof may be included as a portion of other filaments 24b and may be tailored for providing specific characteristics. For instance, polymer filaments can be used for coupling the dry insert with the tube when the same is extruded thereover. In other words, the hot tube extrudate at least partially melts the polymer filaments, thereby causing adhesion between the two. Another example is that elastomeric fibers can be included in the dry insert for providing improved coupling of optical waveguide 12 with tube 18. The use of elastomeric fibers, or other suitable material, may allow for the coupling of dry insert 14 to tube 18, and/or optical waveguide 12 to dry insert 14 by increasing a coefficient of friction. Of course, as depicted in FIGS. 2b–2d adhesives, glues, (FIGS. 2b–2d) or other methods may be used for attaching the dry insert to the tube. Furthermore, the dry insert may include other chemicals or additives to influence properties such as flame-retardance.

Dry insert 14 preferably has a water-swell speed so that the majority of swell height of the water-swellable substance occurs within about 120 seconds or less of being exposed to water, more preferably about 90 seconds or less. Additionally, dry insert 14 preferably has a maximum swell height of about 18 mm for distilled water and about 8 mm for a 5% ionic water solution i.e., salt water in a unrestricted swell state; however, dry inserts with other suitable maximum swell heights may be used. Preferably, tube assemblies are constructed with a water-swell ratio of about 3 or more, more preferably about 5 or more, and most preferably about 7 or more. Water-swell ratio is defined as the unrestricted cross-sectional swell state area of the dry insert divided by the free space in the tube assembly. The free space of the tube assembly is defined as an area of an inner diameter of the tube minus the area that the optical waveguides occupy. For instance, if the dry insert has an unrestricted cross-sectional swell state area of 50 mm$^2$ and the tube has a free space of 10 mm$^2$ the water-swell ratio is five.

Figures 8, 9, 10:
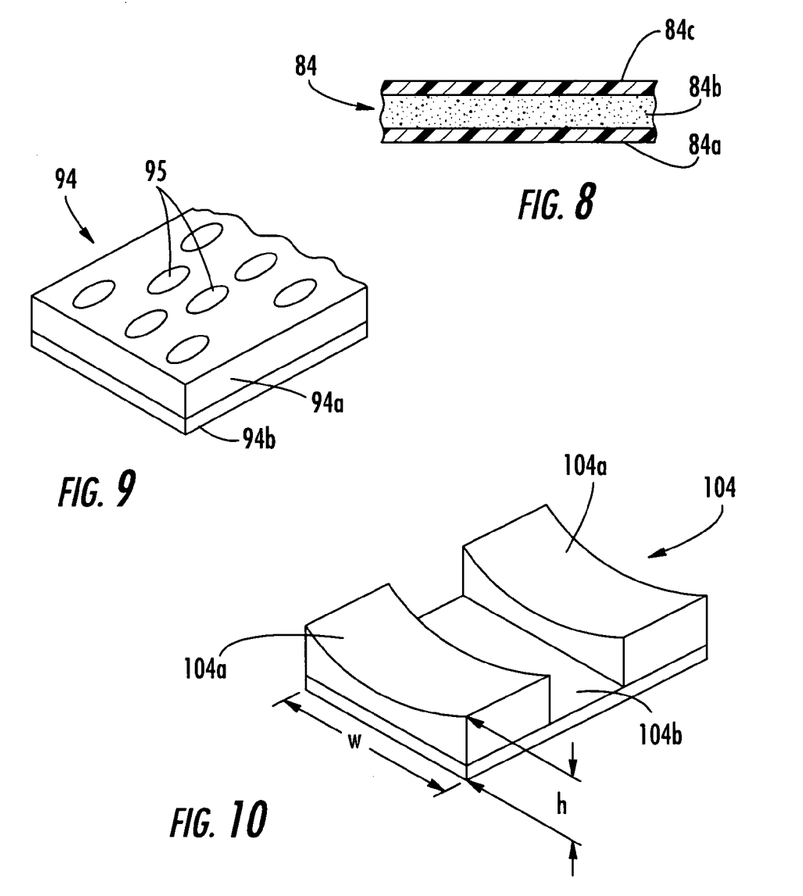
FIG. 8 is a cross-sectional view of another dry insert according to the concepts of the present invention.
FIG. 9 is a perspective view of another dry insert according to the concepts of the present invention.
FIG. 10 is a perspective view of another dry insert according to the concepts of the present invention.

Dry insert 14 may be compressed during assembly so that it provides a predetermined normal force that inhibits subunit 12 from being easily displaced longitudinally along tube 18. Dry inserts 14 preferably have an uncompressed height h of about 5 mm or less for minimizing the tube diameter and/or cable diameter; however, any suitable height h can be used for dry insert 14. Additionally, height h of dry insert 14 need not be constant across the width, but can vary, thereby conforming to the cross-sectional shape of the optical waveguides and providing improved cushioning to improve optical performance (FIG. 10). Second layer 14b is a water-swellable layer such as a tape that inhibits the migration of water within tube 18.

Compression of dry insert 14 is actually a localized maximum compression of dry insert 14. In the case of FIG. 1, the localized maximum compression of dry insert 14 occurs at the corners of the subunit stack across the diameter. Calculating the percentage of compression of dry insert 14 in FIG. 1 requires knowing an inner diameter of tube 18, a diagonal D dimension of the subunit stack, and an uncompressed height h of dry insert 14. By way of example, inner diameter of tube 18 is 8.4 mm, diagonal D of the subunit stack is 5.1 mm, and the uncompressed height h of dry insert 14 across a diameter is 3.6 mm (2 times 1.8 mm). Adding diagonal D (5.1 mm) and the uncompressed height h of dry insert 14 across the diameter (3.0 mm) yields an uncompressed dimension of 8.7 mm. When placing the subunit stack and dry insert 14 into tube 18 with an inner diameter of 8.4 mm, dry insert is compressed a total of 0.3 mm (8.7 mm–8.4 mm). Thus, dry insert 14 is compressed by about ten percent across the diameter of tube 18.

In other embodiments, first layer 14a of dry insert 14 is uncompressed in tube assembly 10, but begins to compress if optical waveguide movement is initiated. Other variations include attaching or bonding a portion of dry insert 14 to tube 18. For example, adhesives, glues, elastomers, and/or polymers 14c are disposed on a portion of the surface of dry insert 14 that contacts tube 18 for attaching dry insert 14 to tube 18. For instance, layer 14c is a polymer layer that at least partially melts during the extrusion of tube 18, thereby creating a bond therebetween. Additionally, it is possible to helically wrap dry insert 14 about subunits 12, instead of being longitudinally disposed. In still further embodiments, two or more dry inserts can be formed about one or more optical waveguides 12 such as two halves placed within tube 18.

Other embodiments may include a fugitive glue/adhesive is used for coupling cable core 15 and/or dry insert 14 with tube 18. The glue/adhesive or the like is applied to the radially outward surface of dry insert 14, for instance, during the manufacturing process. The fugitive glue/adhesive is applied while hot or melted to the outer surface of dry insert 14 and then is cooled or frozen when the cable is quenched or cools off. By way of example, a suitable fugitive glue is available from National Starch and Chemical Company of Bridgewater, N.J. under the tradename LITE-LOK® 70-003A. The fugitive glue or other suitable adhesive/material may be applied in beads having a continuous or an intermittent configuration as shown in FIGS. 2b–2d. For instance, one or more adhesive/glue beads may be longitudinally applied along the dry insert, longitudinally spaced apart beads, in a zig-zag bead along the longitudinal axis of the dry insert, or in any other suitable configuration.

In one application, a plurality of beads of fugitive glue/adhesive or the like is applied to dry insert 14. For instance, three continuous, or non-continuous, beads can be disposed at locations so that when the dry insert is formed about the ribbon stack the beads are about 120 degrees apart. Likewise, four beads can be disposed at locations so they are about 90 degrees apart when the dry insert is formed about the optical waveguides. In embodiments having the beads spaced apart along the longitudinal axis, the beads may have a longitudinal spacing S of about 20 mm and about 800 mm or more; however, other suitable spacing and arrangements may be used. Additionally, beads may be intermittently applied for minimizing the amount of material required, thereby reducing manufacturing expense while still providing sufficient coupling/adhesion. Additionally, glue/adhesive may be applied in cycled lengths rather than beads.

Coupling of the subunits in the tube assembly may be measured using a normalized optical subunit pullout force test. The subunit pullout force test measures the force (N/m) required to initiate movement of a subunit stack from a 10-meter length of cable. Specifically, the test measures the force required to initiate movement of a stack of subunits relative to the tube and the force is divided by the length of the cable, thereby normalizing the optical subunit pullout force. Preferably, the subunit pullout force is in the range of about 0.5 N/m and about 5.0 N/m, more preferably, in the range of about 1 N/m to about 4 N/m.

Figure 4:
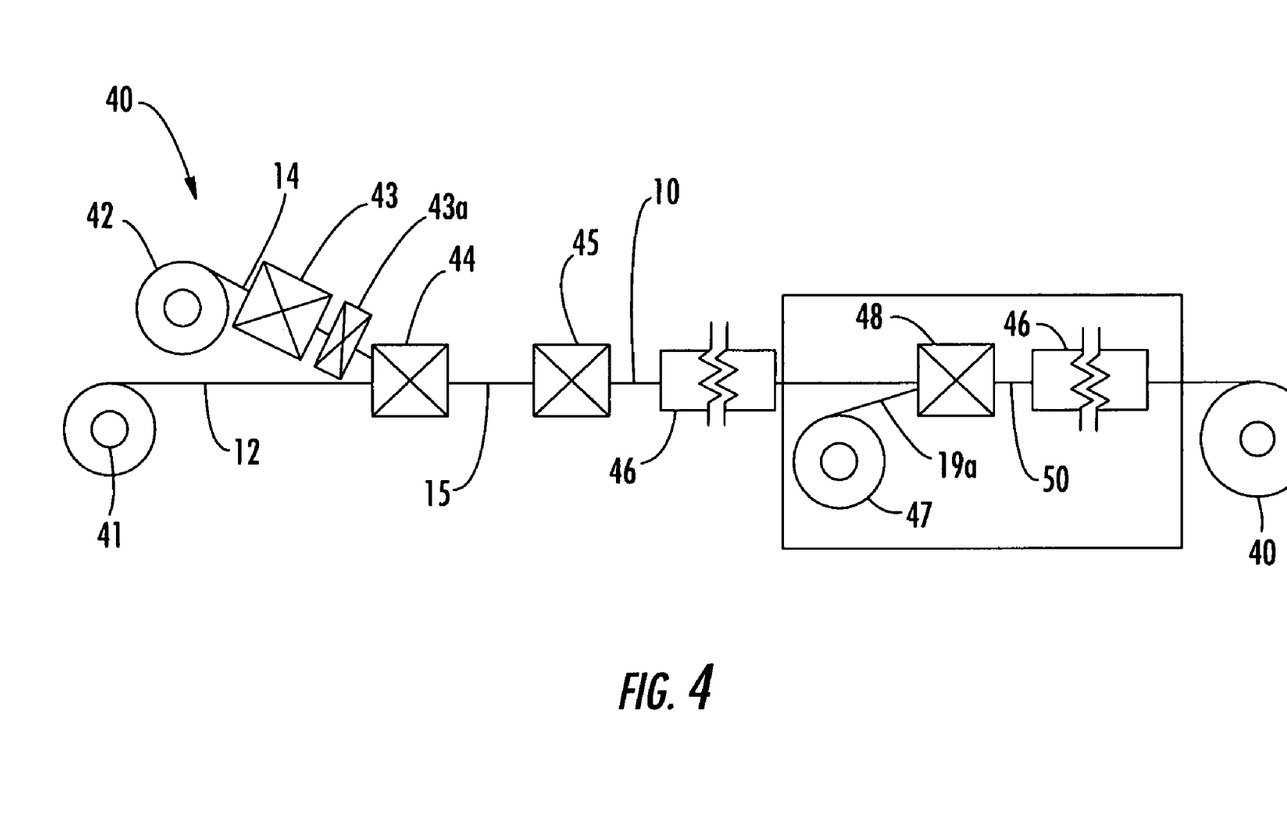
FIG. 4 is a schematic representation of a manufacturing line according to the present invention.

FIG. 4 schematically illustrates an exemplary manufacturing line 40 for tube assembly 10 according to the present invention. Manufacturing line 40 includes at least one subunit payoff reel 41, a dry insert payoff reel 42, an optional compression station 43, an glue/adhesive station 43a, a binding station 44, a cross-head extruder 45, a water trough 46, and a take-up reel 49. Additionally, tube assembly 10 may have a sheath 20 therearound, thereby forming a cable 50 as illustrated in FIG. 5. Sheath 20 can include strength members 19a and a jacket 19b, which can be manufactured on the same line as tube assembly 10 or on a second manufacturing line. The exemplary manufacturing process includes paying-off at least one subunit 12 and dry insert 14 from respective reels 41 and 42. Only one respective payoff reel for subunit 12, dry insert 14, and strength members are shown for clarity; however, the manufacturing line can include any suitable number of payoff reels to manufacture tube assemblies and cables according to the present invention. Next, dry insert 14 is optionally compressed to a predetermined height h at compression station 43 and an optional adhesive/glue is applied to the outer surface of dry insert 14 at station 43a. Then dry insert 14 is generally positioned around optical waveguide 12 and if desired binding station wraps or sews one or more binding threads around dry insert 14, thereby forming core 15. Thereafter, core 15 is fed into cross-head extruder 45 where tube 18 is extruded about core 15, thereby forming tube assembly 10. Tube 18 is then quenched in water trough 46 and then tube assembly 10 is wound onto take-up reel 49. As depicted in the dashed box, if one manufacturing line is set-up to make cable 50, then strength members 19a are paid-off reel 47 and positioned adjacent to tube 18, and jacket 19b is extruded about strength members 19a and tube 18 using cross-head extruder 48. Thereafter, cable 50 passes into a second water trough 46 before being wound-up on take-up reel 49. Additionally, other cables and/or manufacturing lines according to the concepts of the present invention are possible. For instance, cables and/or manufacturing lines may include a water-swellable tape 19c and/or an armor between tube 18 and strength members 19a; however, the use of other suitable cable components are possible.

FIG. 5a depicts another fiber optic cable 50' that employs tube assembly 10, having a sheath 20' that includes a plurality of strength members 19a, at least one ripcord 52, and a cable jacket 19b. As depicted, strength members 19a are generally disposed radially outward of tube assembly 10; however, other cable configurations can dispose strength members in other suitable locations such as within a tube or jacket wall. Additionally, the cable can have either a preferential or non-preferential bend characteristic. In this embodiment, strength members 19a are preferably impregnated fiberglass yarn strands; however, any other suitable tensile yarns or materials can be used such as aramid yarns. More preferably, strength members 19a are stranded around tube 18 in one or more layers, thereby providing coverage of tube 18, thereby inhibiting cable jacket 19b from bonding thereto. Additionally, sheath 20' of this embodiment includes two ripcords 52 disposed radially inward of cable jacket 19b for aiding the craftsman in removing the same. In other embodiments, sheath 20' may include a water-swellable tape wrapped about tube assembly 10 and/or an armor layer. Of course, embodiments of the present invention can use any suitable conductive or dielectric armor such as interlocking, corrugated, or die-formed. If cable 50' is intended for indoor applications, cable jacket 19b preferably is formed from a flame-retardant material so that cable 50' has a plenum or riser rating; however, any other suitable materials can suffice for the cable jacket such as polyethylene or polypropylene. Cable jacket 19b can also include a marking indicia thereon for information or identification purposes.

For instance, in one plenum-rated embodiment, cable 50' uses a PVC for sheath 12b of the subunits and tube 18 and a PVDF for cable jacket 19b. More specifically, sheath 12b and tube 18 are formed from a PVC available from AlphaGary Corporation of Leominster, Mass. under the tradename 8570-L, and cable jacket 19b is formed from a PVDF available from Solef Solvay of Houston, Tex. under the tradename 31008-0003. However, other suitable combinations of materials and/or blends are possible for use in plenum or riser applications. Additionally, a subunit coupling force test may be used for modeling the forces applied to the subunits when subjecting a cable to, for example, pulling during installation of the cable. Although the results between the subunit pullout force and the subunit coupling force may have values in the same general range, the subunit coupling force is generally a better indicator of actual cable performance.

Specifically, the subunit coupling test simulates an underground cable installation in a duct by applying 600 pounds of tension on a 250 m length of cable by placing pulling sheaves on the respective sheaths of the cable ends. However, other suitable loads, lengths, and/or installation configurations can be used for characterizing subunit coupling in other simulations. Then, the force on the subunit(s) along its length is measured from the end of cable. The force on the subunit(s) is measured using a Brillouin Optical Time-Domain Reflectometer (BOTDR). Determining a best-fit slope of the curve normalizes the subunit coupling force. Thus, according to the concepts of the present invention the coupling force is preferably in the range of about 0.5 N/m to about 5.0 N/m, more preferably, in the range of about 1 N/m to about 4 N/m. However, other suitable ranges of coupling force may provide the desired performance.

Figure 7:
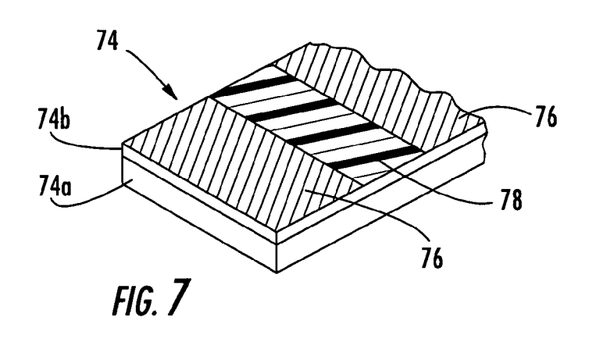
FIG. 7 is a perspective view of another dry insert according to the concepts of the present invention.

Additionally, the concepts of the present invention can be employed with other configurations of the dry insert. As depicted in FIG. 7, dry insert 74 has a first layer 74a and a second layer 74b that includes different suitable types of water-swellable substances. In one embodiment, two different water-swellable substances are disposed in, or on, second layer 14b so that tube assembly 10 is useful for multiple environments and/or has improved water-blocking performance. For instance, second layer 14b can include a first water-swellable component 76 effective for ionized liquids such as saltwater and a second water-swellable component 78 effective for non-ionized liquids. By way of example, first water-swellable material is a polyacrylamide and second water-swellable material is a polyacrylate superabsorbent. Moreover, first and second water-swellable components 76,78 can occupy predetermined sections of the water-swellable tape. By alternating the water-swellable materials, the tape is useful for standard applications, salt-water applications, or both. Other variations of different water-swellable substances include having a water-swellable substance with different swell speeds, gel strengths and/or adhesion with the tape.

FIG. 8 depicts another embodiment of the dry insert. Dry insert 84 is formed from three layers. Layers 84a and 84c are water-swellable layers that sandwich a layer 84b that is compressible for providing a coupling force to the at least one optical waveguide. Likewise, other embodiments of the dry insert can include other variations such as at least two compressible layers sandwiching a water-swellable layer. The two compressible layers can have different spring constants for tailoring the normal force applied to the at least optical waveguide.

FIG. 9 illustrates a dry insert 94 having layers 94a and 94b according to another embodiment of the present invention. Layer 94a is formed from a closed-cell foam having at least one perforation 95 therethrough and layer 94b includes at least one water-swellable substance; however, other suitable materials can be used for the compressible layer. The closed-cell foam acts as a passive water-blocking material that inhibits water from migrating therealong and perforation 95 allows an activated water-swellable substance of layer 94b to migrate radially inward towards the optical waveguide. Any suitable size, shape, and/or pattern of perforation 95 that allows the activated water-swellable substance to migrate radially inward to effectively block water is permissible. The size, shape, and/or pattern of perforations can be selected and arranged about the corner optical waveguides of the stack, thereby improving corner optical waveguide performance. For example, perforations 95 can provide variation in dry insert compressibility, thereby tailoring the normal force on the optical waveguides for maintaining optical performance.

FIG. 10 depicts dry insert 104, which illustrates other concepts of the present invention. Dry insert 104 includes layers 104a and 104b. Layer 104a is formed of a plurality of non-continuous compressible elements that are disposed on layer 104b, which is a continuous water-swellable layer. In one embodiment, the elements of layer 104a are disposed at regular intervals that generally correlate with the lay length of a ribbon stack. Additionally, the elements have a height h that varies across their width w. Stated another way, the elements are shaped to conform to the shape of the optical waveguides they are intended to generally surround.

Figure 13:
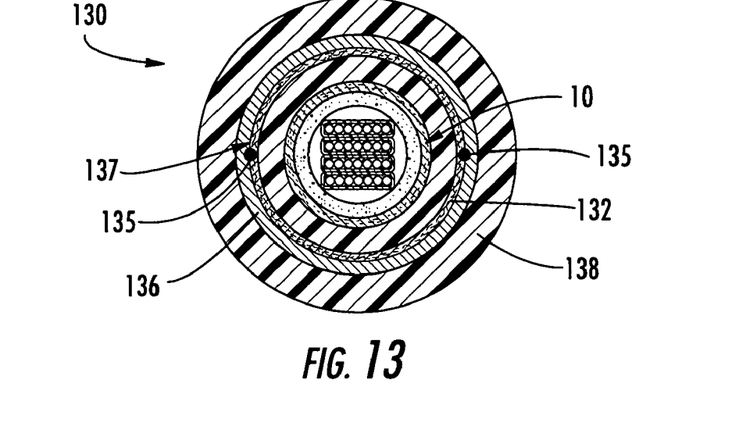
FIG. 13 is a cross-sectional view of a fiber optic cable with an armor layer according to the present invention.

FIG. 13 depicts cable 130, which is another embodiment of the present invention that employs tube assembly 10. Cable 130 includes a sheath system 137 about tube assembly 10 for protecting tube assembly 10 from, for instance, crushing forces and environmental effects. In this case, sheath system 137 includes a water-swellable tape 132 that is secured by a binder thread (not visible), a pair of ripcords 135, an armor tape 136, and a jacket 138. Armor tape 136 is preferably rolled formed; however, other suitable manufacturing methods may be used. The pair of ripcords 135 are generally disposed about one-hundred and eighty degrees apart with about ninety degree intervals from the armor overlap, thereby inhibiting the shearing of ripcord on an edge of the armor tape during use. In preferred embodiments, ripcords suitable for ripping through an armor tape have a construction as disclosed in U.S. patent application Ser. No. 10/652,046 filed on Aug. 29, 2003, the disclosure of which is incorporated herein by reference. Armor tape 136 can be either a dielectric or a metallic material. If a dielectric armor tape is used the cable may also include a metallic wire for locating the cable in buried applications. In other words, the metallic wire makes the cable tonable. Jacket 138 generally surrounds armor tape 136 and provides environmental protection to cable 130. Of course, other suitable sheath systems may be used about the tube assembly.

Figure 14:
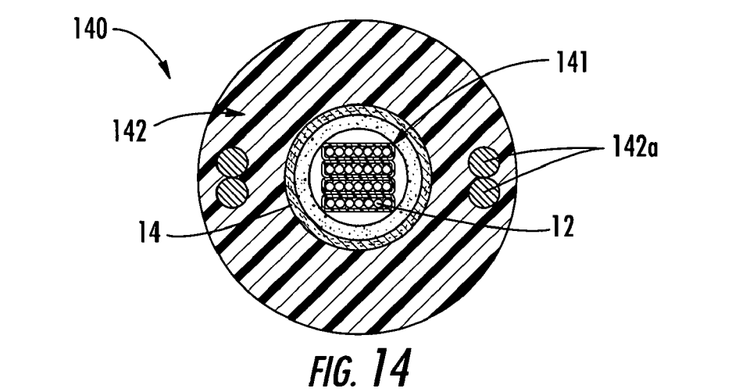
FIG. 14 is a cross-sectional view of a tubeless fiber optic cable according to the present invention.

FIG. 14 depicts fiber optic cable 140. Cable 140 includes at least one optical waveguide 12 and a dry insert 14 forming a cable core 141 within a sheath system 142. In other words, cable 140 is a tubeless design since access to the cable core 141 is accomplished by solely cutting open sheath system 142. Sheath system 142 also includes strength members 142a embedded therein and disposed at about 180 degrees apart, thereby imparting a preferential bend to the cable. Of course, other sheath systems configurations such as different types, quantities, and/or placement of strength members 142a are possible. Cable 140 may also include one or more ripcords 145 disposed between cable core 141 and sheath 142 for ripping sheath 142, thereby allowing the craftsman easy access to cable core 141.

Figure 15:
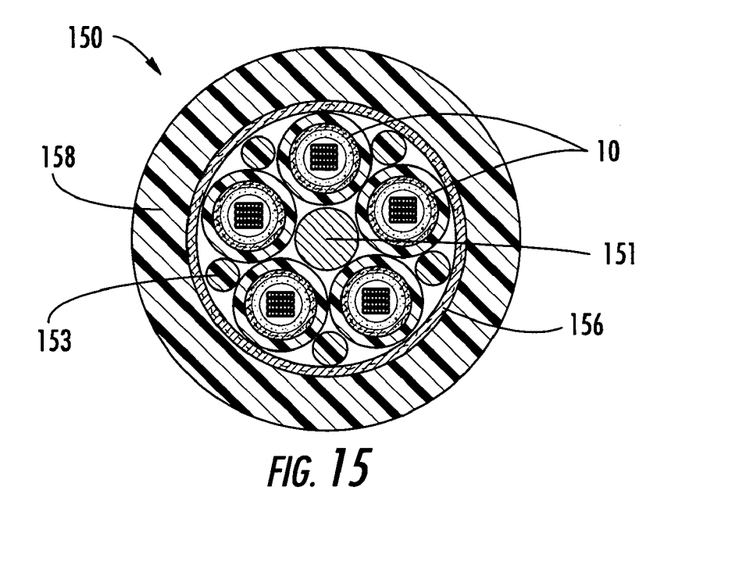
FIG. 15 is a cross-sectional view of a fiber optic cable having stranded tubes according to the present invention.

FIG. 15 depicts a fiber optic cable 150 having a plurality of tube assemblies 10 stranded about a central member 151. Specifically, tube assemblies 10 along with a plurality of filler rods 153 are S-Z stranded about central member 151 and are secured with one or more binder threads (not visible), thereby forming a stranded cable core. The stranded cable core has a water-swellable tape 156 thereabout, which is secured with a binder thread (not visible) before jacket 158 is extruded thereover. Optionally, aramid fibers, other suitable strength members and/or water blocking components such as water-swellable yarns may be stranded about central member 151, thereby forming a portion of the stranded cable core. Likewise, water-swellable components such as a yarns or tape may be placed around central member 151 for inhibiting water migration along the middle of cable 150. Other variations of cable 150 can include an armor tape, an inner jacket, and/or different numbers of tube assemblies.

Figure 16:
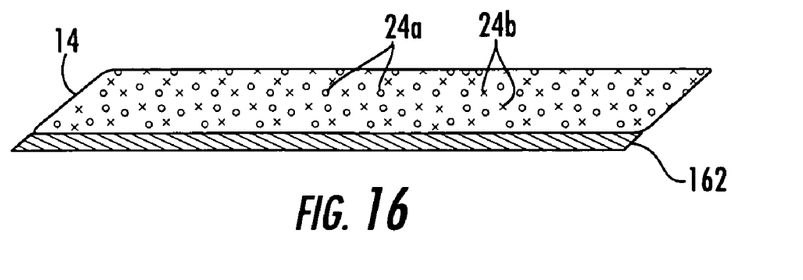
FIG. 16 is a cross-sectional view of the dry insert of FIG. 2a having an additional layer.

FIG. 16 depicts another dry insert 14 having a second layer 162 attached to one side of the felt dry insert of FIG. 2*a*. Using a second layer attached to the felt dry insert allows for several different dry insert configurations. For instance, the felt dry insert may exclude water-swellable filaments, and instead second layer 162 is a water-swellable tape that inhibits the migration of water. In another embodiment, the felt includes water-swellable filaments and a water-swellable tape attached thereto. In a further embodiment, second layer 162 is a meltable layer having a polymer that at least partially melts during extrusion of the tube thereover. Likewise, other dry insert embodiments are possible.

Figure 17:
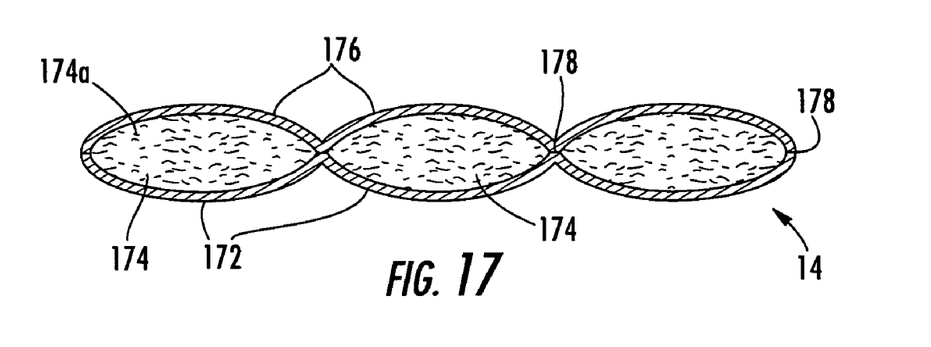
FIG. 17 is a cross-sectional view of still another embodiment of the dry insert according to the present invention.
Figure 18:
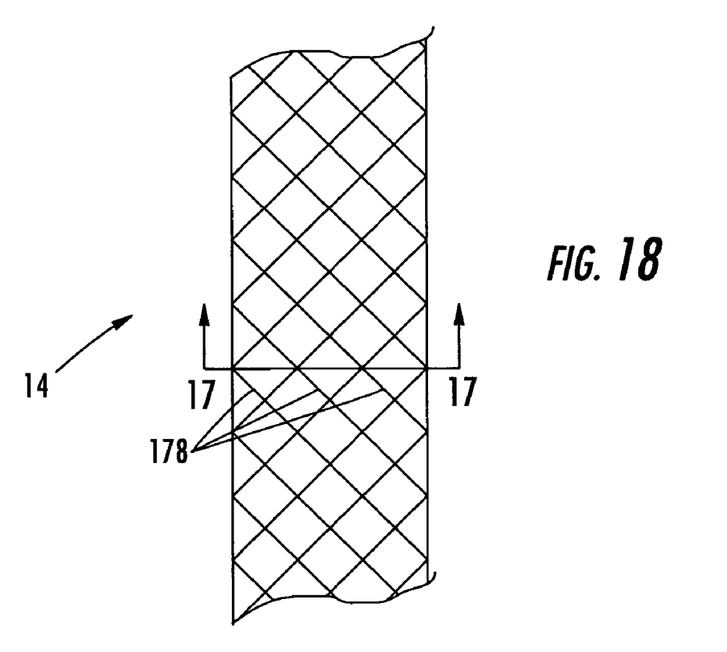
FIG. 18 is a plan view of the dry insert of FIG. 17.

Illustratively, FIGS. 17 and 18 depict dry insert 14 having a first and a second layer 172,176 with at least one water swellable layer 174 disposed in a compartment 174*a* therebetween. In other words, water-swellable layer 174 is generally contained in one or more compartments 174*a* between first and second layers 172,176 that act as backing layers. By way of example, first and second layers may be formed of nylon, polymers, fiberglass, aramid, w-s tape, composite materials, or any other suitable materials in a tape-like configuration. Materials for this configuration should provide the necessary strength to endure the cabling process and intended use. Additionally, at least one of the first and/or second layers should be porous for water penetration. Preferably, water-swellable layer 174 includes non-continuous water-swellable filaments loosely disposed between first and second layers 172,174, thereby forming a compressible dry insert. Suitable water-swellable filaments are, for example, LANSEAL materials available from Toyobo of Osaka, Japan or OASIS materials available from Technical Absorbents Ltd. of South Humberside, United Kingdom. Additionally, water-swellable layer 174 may comprise a water swellable powder along with the water swellable filaments. Moreover, water-swellable layer 174 may include other filaments as a filler to increase the thickness of the water swellable layer and thus of the dry insert, while reducing the cost of the dry insert. The other filaments may comprise any suitable non-swellable as discussed herein.

Furthermore, first and second layers 172,176 are attached together so that water-swellable layer 174 is generally sandwiched therebetween, thereby creating one or more compartments 174*a*, which generally speaking traps water-swellable layer 174 therein. At a minimum, layers 172,176 are attached together at a plurality of seams 178 along the longitudinal edges, but are attachable in other ways. Layers 172,176 are attachable using adhesives, heat where appropriate, stitching, or other suitable methods. In preferred embodiments, layers 172,176 are attached at intermediate positions along the length of the dry insert. As shown in FIG. 18, layers 172,176 are attached together using a diamond pattern of seams 178; however, other suitable patterns such as triangular, semi-circular, or curvilinear patterns are possible, thereby creating the plurality of compartments 174*a*. Additionally, the seams between compartments can be arranged for aiding in forming the dry insert about the optical waveguides. Compartmentalization of water-swellable layer 174 advantageously inhibits moving or shifting of the material beyond the individual compartment. Moreover, the compartments add a pillowly texture to the dry insert.

In further embodiments, first and second layers 172,176 need not comprise the same material. In other words, the materials of the first and second layers may be selected to tailor the dry insert behavior according to the needs of each side of the dry insert. For instance, the first layer is tailored to adhere with the extruded tube and the second layer is tailored to have a smooth finish for contact with the optical waveguides. Additionally, in other embodiments the dry insert can have more than a first and second layers to, for instance, optimize the attachment of the layers, coupling, and/or inhibit water migration. However, the dry insert should not be so stiff that it is too difficult to manufacture into a cable assembly. Additionally, as shown in FIG. 2*a* it may be advantageous for one of the longitudinal edges of any of the dry inserts to have a tapered edges 24*c* so that the longitudinal edges may overlap without a large bulge when the dry insert is formed about the at least on optical fiber 12.

Figure 19:
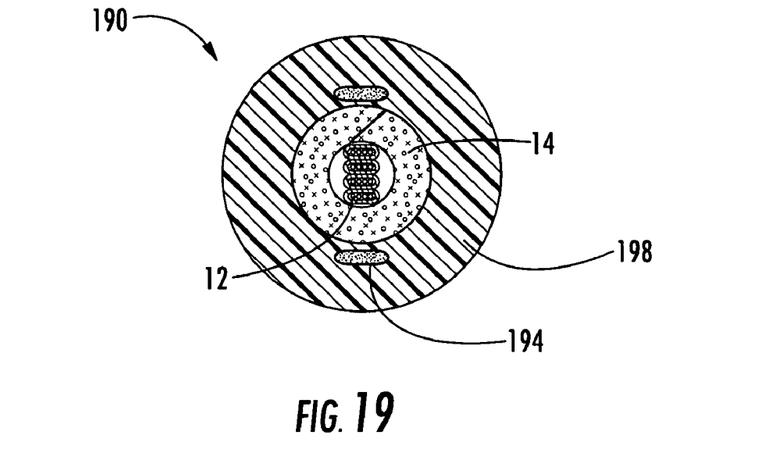
FIGS. 19 and 20 are cross-sectional views of tubeless fiber optic cables according to the present invention.
Figure 20:
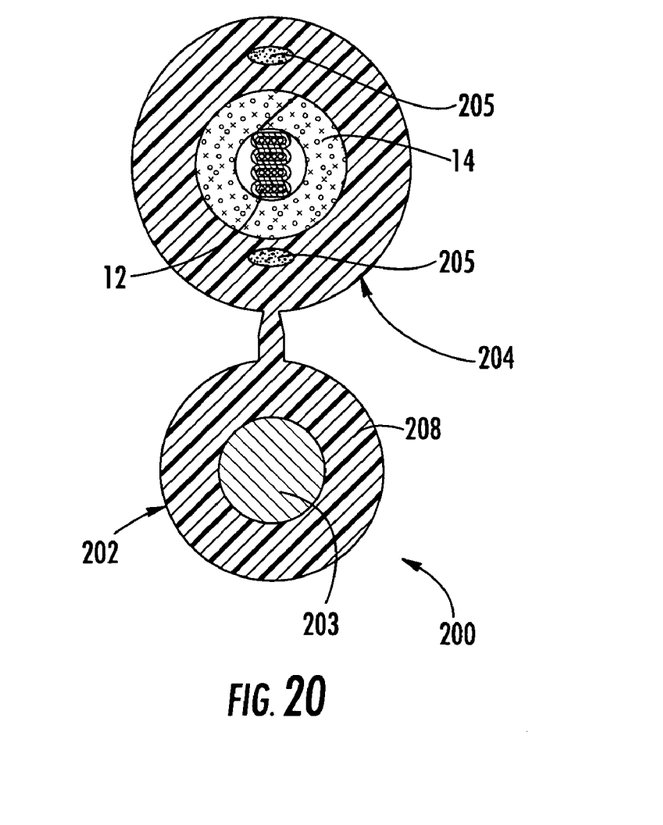

FIGS. 19 and 20 depict explanatory tubeless cable designs according to the present invention. Specifically, cable 190 is a drop cable having at least subunit 12 generally surrounded by dry insert 14 within a cavity of jacket 198. Cable 190 also includes at least one strength member 194. Other tubeless drop cable configurations are also possible such as round or oval configurations. FIG. 20 depicts a tubeless figure-eight drop cable 200 having a messenger section 202 and a carrier section 204 connected by a common jacket 208. Messenger section 202 includes a strength member 203 and carrier section 204 includes a cavity having at least one subunit 12 that is generally surrounded by dry insert 14. Carrier section 204 can also include at least one anti-buckling member 205 therein for inhibiting shrinkage when carrier section 204 is separated from messenger section 202. Although, FIGS. 19 and 20 depict a dry insert similar to the dry insert of FIG. 2, but any suitable dry insert may be used.

Many modifications and other embodiments of the present invention, within the scope of the appended claims, will become apparent to a skilled artisan. For example, subunits can be formed in a variety of stacks or configurations such as a stepped profile or the like. Likewise, a subunit may have a sheath that encloses more than one ribbon. Additionally, tube assemblies or cables can include configurations having other components such as strength members, ripcords, water-swellable materials, armor, electrical components, or other suitable cable components. Also, dry inserts of the present invention can be laminated together as shown or applied as individual components. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical waveguides, but the inventive concepts of the present invention are applicable to other suitable optical waveguides and/or cable configurations.

That which is claimed:

1. A fiber optic cable comprising:
    a plurality of subunits, the plurality of subunits each including a single respective fiber optic ribbon and a respective sheath that is tight-buffered about the single respective fiber optic ribbon so that each respective sheath must be breached to access the respective fiber optic ribbon thereby providing a security feature for each subunit, wherein each fiber optic ribbon includes a plurality of optical fibers connected by a matrix material and the plurality of subunits form a subunit stack;

at least one dry insert, the dry insert disposed about the plurality of subunits for coupling the plurality of subunits within the fiber optic cable, wherein the plurality of subunits have a normalized pull-out force between about 0.5 N/m and about 5.0 N/m;

at least one strength member; and a cable jacket.

2. The fiber optic cable of claim 1, the subunit stack having at least two subunits with the respective ribbons of the at least two subunits having a different number of optical fibers in the respective ribbons.

3. The fiber optic cable of claim 1, further comprising a tube, the tube housing at least a portion of the subunit stack, thereby forming a tube assembly.

4. The fiber optic cable of claim 1, further comprising an electrical component.

5. The fiber optic cable of claim 1, the fiber optic cable being a figure-eight cable.

6. The fiber optic cable of claim 1, the fiber optic cable having a water-swell ratio of about three or more.

7. The fiber optic cable of claim 1, further comprising an armor layer.

8. The fiber optic cable of claim 1, the fiber optic cable having a portion being formed from a flame-retardant material.

9. The fiber optic cable of claim 1, the at least one dry insert including an open cell polyurethane foam.

10. The fiber optic cable of claim 1, further comprising a normalized subunit coupling force between about 0.5 N/m and about 5 N/m.

11. The fiber optic cable of claim 1, the at least one dry insert having a first layer that is compressible which is laminated to a second water-swellable layer.

12. The fiber optic cable of claim 1, the sheath having a thickness of about 0.3 millimeters.

* * * * *